Feb. 18, 1930.  G. T. WILLIAMS  1,747,851
COLLAPSIBLE CORE
Filed Aug. 19, 1926  2 Sheets-Sheet 1

INVENTOR.
GEORGE T. WILLIAMS.
BY
ATTORNEY.

Feb. 18, 1930.  G. T. WILLIAMS  1,747,851
COLLAPSIBLE CORE
Filed Aug. 19, 1926  2 Sheets-Sheet 2
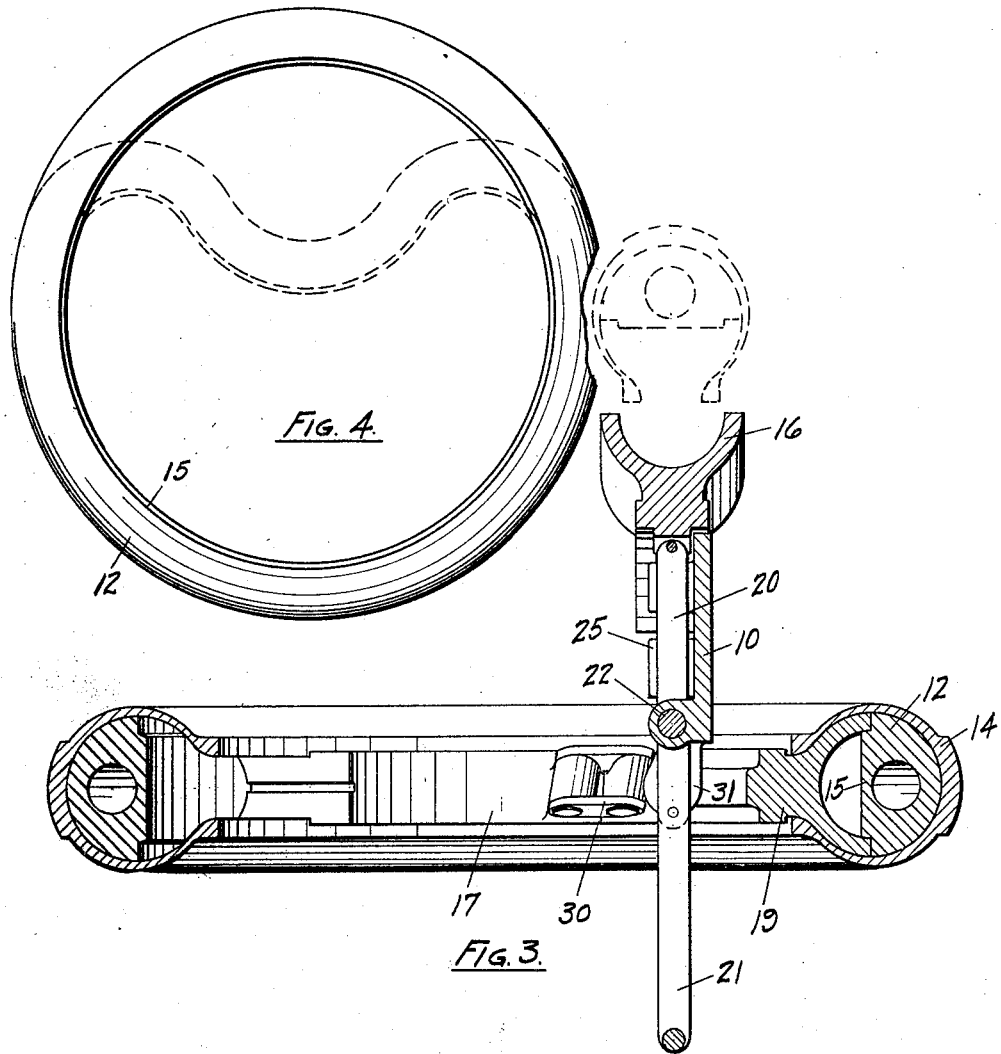

Patented Feb. 18, 1930

1,747,851

UNITED STATES PATENT OFFICE

GEORGE T. WILLIAMS, OF AKRON, OHIO, ASSIGNOR TO THE INDIA MACHINE & RUBBER MOLD COMPANY, OF AKRON, OHIO, A CORPORATION OF OHIO

COLLAPSIBLE CORE

Application filed August 19, 1926. Serial No. 130,209.

The present invention relates to collapsible cores for use in the manufacture of pneumatic tires, the object of the invention being to construct a form of collapsible core which will enable tires of large cross-section and small bead diameters to be stripped from the cores in collapsed condition. While existing forms of collapsible cores have been satisfactory on many sizes of tires, there are limitations, due to the bulk of the cores and the space occupied by the collapsing mechanism in the center of the tire, which restrict the usefulness of these cores in many of the more recently developed sizes, particularly those tires which are intended and adapted for use on trucks and busses and other heavy duty service.

With the form of core shown herein, the arrangement is such that tires of all sizes may be collapsed easily and quickly, the mechanism being easily operated and capable of a very wide and effective range of movement.

In the drawings, one form or embodiment of the invention only is shown, it being understood that changes and modifications may be made in the details of the construction within the scope of the invention as set forth in the claims.

In the drawings:

Figure 3 is a sectional view of the core in its partially collapsed condition; and Figure 4 is a view of the tread portion of the core showing the manner in which it may be collapsed.

Figure 2:
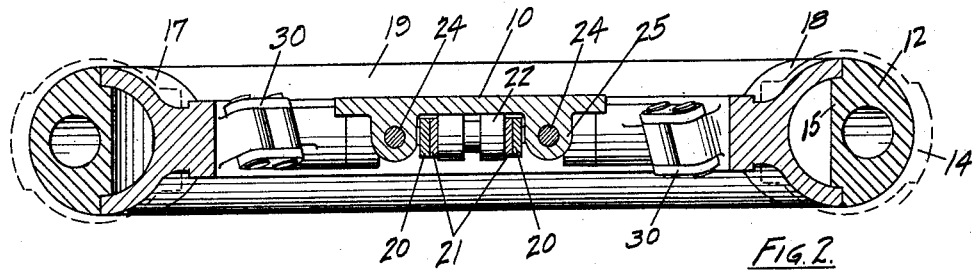
Figure 2 is a section on the line 2—2 of Figure 1.
Figure 1:
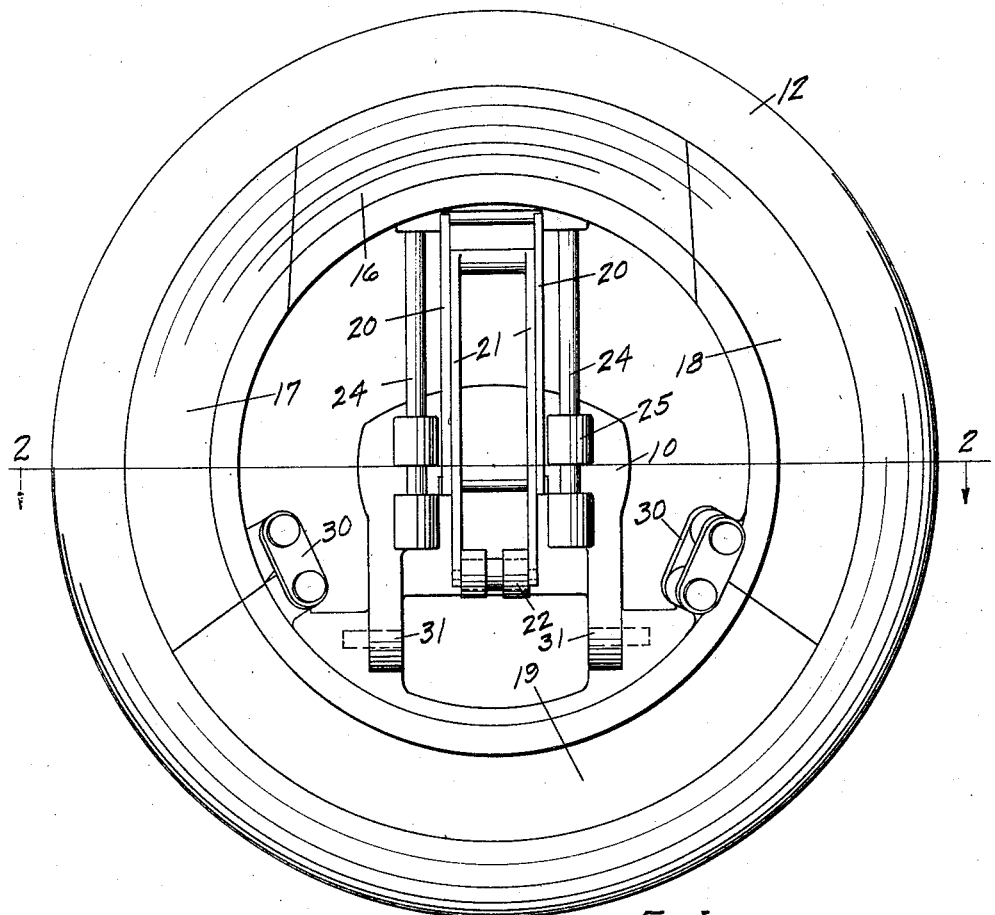
Figure 1 is a side elevation of a complete core in annular or operative condition.

The core is composed of the usual or standard chuck plate 10 by which it is attached to and carried upon the rotating shaft of the tire building machine or the building stand. A well known type of collapsing mechanism has been shown and will be described, but it will be expressly understood that other forms of collapsing mechanism may be substituted therefor.

The core is composed of two parts, an outer flexible ring-shaped section and an inner section which is segmental so that it can be removed from the tire by the collapsing mechanism. The core is accordingly divided upon a circumferential line, transversely of the core and approximately midway between the beads and the tread of the tire, although the location of the division line is not fixed and may be changed as desired.

The outer or tread portion of the core is indicated at 12 and is a continuous ring of flexible material, preferably of vulcanized rubber, being of sufficient flexibility to enable it to be bent inwardly as shown in Figure 4 to free itself from the interior of the tire casing 14. It is also of sufficient elasticity so that it will spring back and reassume its circular form. The inner circumference of the section 12 is formed with a rib 15 by which it is seated on the inner or segmental portion of the core.

The balance of the core is formed in a plurality of segments, here shown as four in number, and carrying the reference numerals 16, 17, 18 and 19. These segments complete the collapsible core, the flanges of the segments affording a seat for the central rib 15 on the circular section 12.

The segment 16 is a key section, being tapered outwardly so that it can be withdrawn toward the center of the core, being for this purpose connected to links 20 which are pivoted at a midway point to an operating lever 21 which is, in turn, pivoted to lugs 22 on the core supporting plate. The key segment carries a pair of guide rods 24 which are slidably received in lugs 25 on the central plate 10. When the lever 21 is moved outwardly and downwardly, the key segment will be withdrawn to the position shown in Figure 3, the section 12 remaining in the tire.

The segments 17, 18 and 19 are hinged together in a group, preferably by angularly arranged hinges 30, the central section being carried upon horizontal pivots 31 also carried by the central plate 10. After the key segment is withdrawn, the tire, with the section 12 therein and the segments 17, 18 and 19 therein, is rocked downwardly upon the pivots 31 until it occupies a position at an angle to the original core plane. The segments 17 and 18 are then moved inwardly upon the hinges 30, leaving the section 12 in the tire, the angular positioning of the hinges enabling the sections to clear each other upon swinging inwardly. The tire can then be removed from the core and the ring 12 slipped from within the tire, which is then ready for the subsequent manufacturing operations.

To erect the core, the ring 12 is placed about the core which is restored to its full operative position by a reversal of the contracting or collapsing operation.

It will be observed that a very substantial contraction of the core is possible with the construction as described and shown, and greater facility and ease of operation is obtained than with former core constructions. These and other advantages will be apparent to those skilled in this art, it being understood that the invention is subject to considerable modifications and variations within the scope and purview thereof. The ring-shaped section may be of any form and while preferably endless, may be otherwise constructed if found desirable. The original segments constitute a firm base for shaping and trimming of the tire fabric.

What is claimed is:

1. A collapsible core for use in the building of pneumatic tires, comprising the combination of a central supporting plate and collapsing mechanism carried thereby, and a sectional core divided upon a circumferential line between the beads and the tread of the tire, the outer section being a solid flexible endless ring, the inner section being segmental, the several segments providing a seat for the ring, the collapsing mechanism connected to the several segments whereby they may withdraw from within the tire independently of the ring and restored thereto.

2. A collapsible core for use in the building of pneumatic tires, comprising the combination of collapsing mechanism at the center of the core, a plurality of core segments connected to the collapsing mechanism and by which they may be withdrawn, the outer circumference of the segments in erected position constituting a seat, and a solid flexible ring about the outer circumference of said segments and seated thereon to complete the core structure.

3. A tire building core divided along a circumferential line between the beads and tread of the tire, the inner and outer sections being separable, the inner section being segmental, and collapsing mechanism for moving the several segments to collapsed position so that the tire and the outer section may be removed therefrom.

4. A tire building core divided into sections along a circumferential line between the beads and the tread of the tire, the outer section being a flexible ring, the inner section being formed in segments which when placed together constitute a circular seat for the ring, and means for expanding the segments against the outer and for withdrawing the segments from the outer section.

5. A tire building core comprising separable inner and outer sections divided on a circumferential line between the tread and the beads of the tire, the inner section being connected to mechanism whereby it may be collapsed and the outer section being removable with the tire.

GEORGE T. WILLIAMS.